United States Patent
Yamamori (10) Patent No.: US 10,784,526 B2
(45) Date of Patent: Sep. 22, 2020

(54) FUEL CELL VEHICLE AND CONTROL METHOD OF FUEL CELL VEHICLE

(71) Applicant: TOYOTA JIDOSHA KABUSHIKI KAISHA, Toyota-shi, Aichi-ken (JP)

(72) Inventor: Keitaro Yamamori, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 18 days.

(21) Appl. No.: 16/046,386

(22) Filed: Jul. 26, 2018

(65) Prior Publication Data

US 2019/0109338 A1  Apr. 11, 2019

(30) Foreign Application Priority Data

Oct. 11, 2017 (JP) ................. 2017-197449

(51) Int. Cl.
*H01M 8/04746* (2016.01)
*B60L 58/33* (2019.01)
(Continued)

(52) U.S. Cl.
CPC ........... *H01M 8/04753* (2013.01); *B60K 1/00* (2013.01); *B60K 1/04* (2013.01); *B60L 50/72* (2019.02); *B60L 58/33* (2019.02); *H01M 8/0441* (2013.01); *H01M 8/04111* (2013.01); *H01M 8/04201* (2013.01); *B60K 2001/001* (2013.01);
(Continued)

(58) Field of Classification Search
CPC ...... B60K 1/00; B60K 1/04; B60K 2001/001; B60K 2001/0438; B60L 58/33; B60L 50/72; H01M 2250/20; H01M 8/04753; B60Y 2400/202
See application file for complete search history.

(56) References Cited

U.S. PATENT DOCUMENTS

| | | | |
|---|---|---|---|
| 2002/0034669 A1* | 3/2002 | Kobayashi | ........ H01M 8/04089 429/432 |
| 2007/0007194 A1 | 1/2007 | Yoshida et al. | |
| 2008/0187790 A1* | 8/2008 | Kamihara | ......... H01M 8/04231 429/429 |

(Continued)

FOREIGN PATENT DOCUMENTS

| | | |
|---|---|---|
| DE | 10331937 A1 | 2/2005 |
| JP | 2005129463 A | 5/2005 |

(Continued)

OTHER PUBLICATIONS

JP-2009170209-A translation (Year: 2019).*

*Primary Examiner* — Ula C Ruddock
*Assistant Examiner* — Armindo Carvalho, Jr.
(74) *Attorney, Agent, or Firm* — Hunton Andrews Kurth LLP (57) ABSTRACT

A fuel cell vehicle is configured such that at least a part of an underfloor of a vehicle body is formed to have a shape causing a downforce to the vehicle body by wind passing below the underfloor, and an exhaust port via which exhaust gas from a cathode-side passage of a fuel cell is discharged is disposed in a negative pressure region where a negative pressure is caused by the shape causing the downforce. A magnitude of the negative pressure to be caused by the shape is detected or estimated, so that a driving amount of an air supply configured to supply air to the fuel cell is controlled according to the magnitude of the negative pressure thus detected or estimated.

10 Claims, 8 Drawing Sheets

(51) Int. Cl.
  *B60L 50/72*  (2019.01)
  *B60K 1/00*  (2006.01)
  *B60K 1/04*  (2019.01)
  *H01M 8/04111*  (2016.01)
  *H01M 8/04082*  (2016.01)
  *H01M 8/0438*  (2016.01)

(52) U.S. Cl.
  CPC . *B60K 2001/0438* (2013.01); *B60Y 2400/202* (2013.01); *H01M 2250/20* (2013.01)

(56) References Cited

U.S. PATENT DOCUMENTS

| | | | | |
|---|---|---|---|---|
| 2009/0104501 A1* | 4/2009 | Gerhardt | ............ | H01M 8/0297 |
| | | | | 429/532 |
| 2014/0020968 A1* | 1/2014 | Ikeya | ............ | B60K 1/04 |
| | | | | 180/65.31 |

FOREIGN PATENT DOCUMENTS

| | | | |
|---|---|---|---|
| JP | 2005153852 A | | 6/2005 |
| JP | 2007311305 A | | 11/2007 |
| JP | 2009170209 A | * | 7/2009 |
| JP | 2009170209 A | | 7/2009 |
| JP | 2009283404 A | | 12/2009 |
| JP | 2012224144 A | | 11/2012 |
| JP | 2015210898 A | | 11/2015 |

\* cited by examiner

FUEL CELL VEHICLE AND CONTROL METHOD OF FUEL CELL VEHICLE

INCORPORATION BY REFERENCE

The disclosure of Japanese Patent Application No. 2017-197449 filed on Oct. 11, 2017 including the specification, drawings and abstract is incorporated herein by reference in its entirety.

BACKGROUND

1. Technical Field

The disclosure relates to a fuel cell vehicle and a control method of a fuel cell vehicle.

2. Description of Related Art

A vehicle provided with a fuel cell system that performs electric-power generation mainly by a fuel cell uses atmospheric air (air) for various purposes. One of the purposes is that air is used as oxidant gas to be reacted with hydrogen gas as fuel gas. In order to send, into the fuel cell, an amount of air corresponding to an amount of electric power to be generated, the fuel cell system is provided with a compressor.

In addition to that, in the fuel cell system, a large amount of air is also used in a diluter for diluting hydrogen gas to be discharged. For example, in Japanese Unexamined Patent Application Publication No. 2009-170209 (JP 2009-170209 A), a negative pressure is caused by exhaust gas from a fuel cell and the negative pressure is used to take in air necessary for dilution. The exhaust gas from the fuel cell is residual gas of the air sent into the fuel cell by a compressor of the fuel cell system, the residual gas being not used for chemical reaction in the fuel cell.

SUMMARY

In JP 2009-170209 A, the negative pressure of the exhaust gas is used, but power of the compressor is used to cause the negative pressure. Eventually, using the air in the fuel cell system needs to operate the compressor and consume electric power. This results in that electric power is used for the fuel cell to generate electric power. On this account, in order to increase efficiency of the fuel cell system, it has been demanded to use energy efficiently in a whole fuel cell vehicle, including power consumption by the compressor.

The disclosure may be realized as the following aspects and applications.

An aspect of the disclosure relates to a fuel cell vehicle including: a fuel cell; a portion having a shape causing a downforce, the portion being at least a part of an underfloor of a vehicle body and being configured to apply the downforce to the vehicle body by wind passing below the underfloor; and an exhaust port via which exhaust gas from a cathode-side passage of the fuel cell is discharged, wherein the exhaust port is disposed in a negative pressure region where a negative pressure is caused by the shape causing the downforce.

In the fuel cell vehicle of the above aspect, the exhaust port for exhaust gas is disposed in the negative pressure region, so that oxidant gas flowing in the cathode-side passage of the fuel cell can be taken in by use of a negative pressure. The negative pressure is caused by the shape causing the downforce caused by wind passing below the underfloor of the vehicle. On this account, with the fuel cell vehicle of the above aspect, it is not necessary to provide a special component or to perform processing of forming a special shape for intake of gas on the cathode side by use of a negative pressure.

In the above aspect, the fuel cell and the portion having the shape causing the downforce may be provided in a front part of the vehicle body in a travel direction. With the fuel cell vehicle of the above aspect, the downforce caused by travel wind can be easily obtained in the front part of the vehicle body in the travel direction.

In the above aspect, the front part of the vehicle body in the travel direction may be a part forward of rear wheels provided in the fuel cell vehicle. In the fuel cell vehicle of the above aspect, the exhaust port is provided in the negative pressure region. With such a configuration, the position of the exhaust port can be also placed forward of the rear wheels, so that the configuration is preferable in terms of a relationship with a subsequent vehicle.

In the above aspect, the negative pressure region may be provided between front wheels and rear wheels provided in the fuel cell vehicle. With the fuel cell vehicle of the above aspect, the downforce can be caused efficiently by travel wind from the front side in the vehicle front-rear direction and the position of the exhaust port can be placed within a desirable range.

In the above aspect, the shape causing the downforce may include: a flat portion provided in at least a part of the underfloor and formed at an angle within ±20 degrees with respect to a road surface; and a projection portion projecting from the flat portion in a direction toward the road surface. With the fuel cell vehicle of the above aspect, the negative pressure region can be formed effectively by the flat portion and the projection portion.

In the above aspect, the fuel cell vehicle may further include: an air supply driven by driving power of a power source and configured to supply air to the fuel cell; a detection portion configured to detect or estimate a magnitude of the negative pressure to be caused by the shape causing the downforce; and a controller configured to perform control to reduce a driving amount of the air supply driven by the power source according to the magnitude of the negative pressure which is detected or estimated by the detection portion. With the fuel cell vehicle of the above aspect, the driving amount of the air supply can be reduced and energy efficiency of the whole vehicle can be raised. When the driving amount of the air supply can be reduced, the size and the rating of the air supply to be provided in the vehicle can be made small, so that the energy efficiency can be improved in the vehicle as a whole.

In the above aspect, the air supply may be a compressor configured to send the air into the fuel cell, the compressor being provided on the upstream side of a passage via which the air is supplied to the fuel cell. With the fuel cell vehicle of the above aspect, electric power of the compressor that sends the air into the fuel cell can be reduced. Note that, as an air supply unit, a configuration to take in the air on an exhaust-side passage side connected to a cathode passage of the fuel cell can be also employed other than the compressor.

In the above aspect, the compressor may be a turbo compressor. In the fuel cell vehicle of the above aspect, the turbo compressor has an air resistance smaller than that of a roots-type compressor at the time of stop, and this is advantageous to intake of gas in the cathode passage by a negative pressure. As a matter of course, in a case of using intake by a negative pressure, any compressor such as a roots-type compressor may be usable.

In the above aspect, the detecting portion may be at least any one of a negative pressure sensor, a speed sensor, and a flow rate sensor. The negative pressure sensor may measure the magnitude of the negative pressure. The speed sensor may detect a speed of the fuel cell vehicle. The flow rate sensor may measure a flow rate of air around the exhaust port. With the fuel cell vehicle of the above aspect, the magnitude of the negative pressure may be directly detected or may be estimated from a parameter such as a speed.

In the above aspect, the controller may be configured not to drive the air supply when an absolute value of the negative pressure which is detected or estimated by the detection portion is larger than or equal to a predetermined value. With the fuel cell vehicle of the above aspect, if intake of necessary gas on the cathode side can be performed by the negative pressure in the negative pressure region, the air supply may be stopped.

Another aspect of the disclosure relates to a control method for controlling a fuel cell vehicle, the fuel cell vehicle being configured such that at least a part of an underfloor of a vehicle body is formed to have a shape causing a downforce to the vehicle body by wind passing below the underfloor, and an exhaust port via which exhaust gas from a cathode-side passage of the fuel cell is discharged is disposed in a negative pressure region where a negative pressure is caused by the shape causing the downforce, the control method including: detecting or estimating a magnitude of the negative pressure to be caused by the shape causing the downforce; and controlling a driving amount of an air supply according to the magnitude of the negative pressure which is detected or estimated, the air supply being configured to supply air to the fuel cell, wherein the air supply is driven by driving power of a power source.

With the control method of the above aspect, intake of gas on the cathode side is performed by use of the negative pressure caused by the shape causing the downforce and the driving amount of the air supply is controlled according to the magnitude of the negative pressure. Accordingly, the driving amount of the air supply can be controlled without providing any special component or performing processing of forming a special shape. This makes it possible to increase energy efficiency of the whole vehicle.

The disclosure can be also performed as aspects such as a design method of a fuel cell vehicle, a manufacturing method of a fuel cell vehicle, a vehicle under cover and a manufacturing method thereof, and the like, other than the aspects described above.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
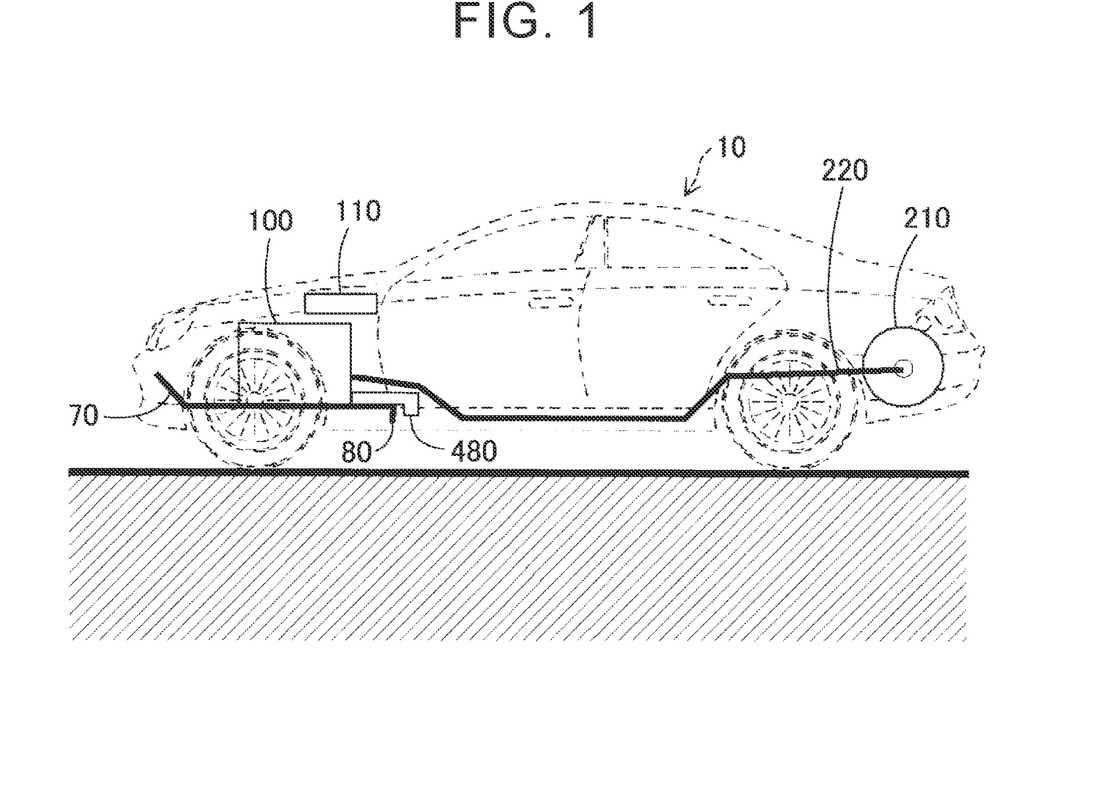
FIG. 1 is an explanatory view schematically illustrating a configuration of an essential part of a vehicle provided with a fuel cell.

FIG. 1 is an explanatory view schematically illustrating a configuration of a fuel cell vehicle 10 (hereinafter just referred to as the vehicle 10) provided with a fuel cell. In FIG. 1, the external appearance of the fuel cell vehicle 10 is indicated by a broken line, and a main component is indicated by a continuous line. The vehicle 10 includes a fuel cell 100, a controller 110 (also referred to as an electronic control unit (ECU)), and a fuel gas tank 210 in which hydrogen gas as a fuel is accumulated at a high pressure, in addition to a vehicle body, front wheels and rear wheels for supporting the vehicle body, and so on. The fuel cell 100 is provided in a front part of the vehicle 10, and the fuel gas tank 210 is provided in a rear part of the vehicle 10. Hydrogen gas from the fuel gas tank 210 is supplied to the fuel cell 100 via a fuel gas supply passage 220 provided to pass below a cabin space (below an underfloor) of the vehicle 10.

The fuel cell 100 generates electric power by electrochemical reaction between hydrogen as fuel gas sent from the fuel gas tank 210 and oxygen as oxidant gas sent by use of atmospheric air. The fuel cell 100 is configured as a stack in which a plurality of single cells is laminated. A single cell is a unit for performing electric-power generation. Hydrogen and oxygen are supplied respectively to an anode and a cathode in each of the single cells via passages inside the stack, and in the each of the single cells, electric-power generation is performed by movement of protons via a polymer electrolyte membrane (not illustrated). Since air including oxygen is sent into the cathode such that a stoichiometry ratio is 1.0 or more, air that is not used for the electrochemical reaction is discharged from the fuel cell 100. A passage through which the air passes in the fuel cell 100 is referred to as a cathode-side passage. An exhaust port 480 via which exhaust gas from the cathode-side passage is discharged is provided in the fuel cell 100. The exhaust port 480 is provided further behind a rear-side terminal end of an under cover 70 covering a front part of the underfloor of the vehicle 10. A projection portion 80 is provided in the rear-side terminal end of the under cover 70 in the vehicle front-rear direction of the vehicle 10. The overall configuration of the fuel cell 100, a relationship between the exhaust port 480 and the under cover 70, and the like will be described later in detail.

Figure 2:
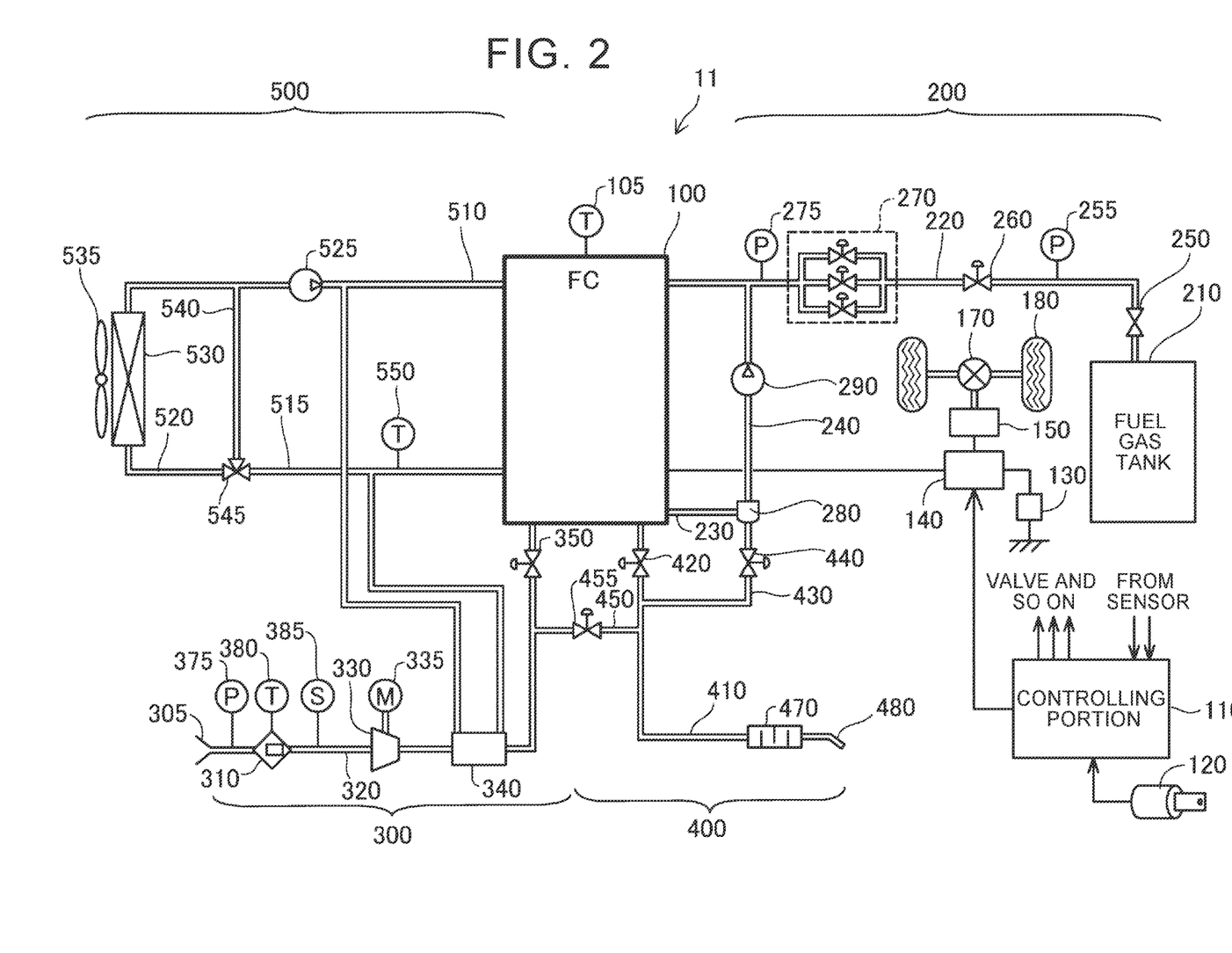
FIG. 2 is an explanatory view illustrating a schematic configuration of a fuel cell system provided in the vehicle.

FIG. 2 is a schematic configuration diagram of a fuel cell system 11 that operates the fuel cell 100. The fuel cell system 11 roughly includes the fuel cell 100, a fuel gas supply circuit 200, an air supply circuit 300, an exhaust gas circuit 400, a cooling circuit 500, and the controller 110 for controlling a valve, a motor, and the like provided in each of the circuits. When a start switch 120 provided in the vehicle 10 is turned on, the controller 110 operates the fuel cell system 11, so that electric-power generation by the fuel cell 100 is performed. Electric power generated herein is used to drive a drive motor 150, and the drive motor 150 rotates driving wheels 180 via a power distribution gear 170 so that the vehicle runs. In FIG. 2, an electric power system is illustrated in a simplified manner, but the fuel cell system 11 is provided with a battery 130, so that the drive motor 150, accessories (not shown), and the like are driven by electric power from the battery 130 until electric power supply from the fuel cell 100 is established. Further, at the time of braking, electric power regenerated by the drive motor 150 is stored in the battery. In order to perform such electric-power control, the vehicle 10 is provided with an electric-power distribution controller 140 including an inverter, a converter for voltage-up/voltage-down, and the like. The controller 110 communicates with the electric-power distribution controller 140, so that the controller 110 can detect an electric-power generation state of the fuel cell 100, more specifically, an electric-power generation voltage DC, a supply current Ia, and the like. The detailed description including the configuration of the electric-power distribution controller 140 is omitted.

The following describes members constituting the fuel cell system 11. As has been already described, the fuel cell 100 performs electric-power generation by use of reaction between hydrogen and oxygen. The fuel cell 100 is provided with a temperature sensor 105 for detecting its temperature. The fuel gas supply circuit 200 supplies hydrogen gas to the fuel cell 100 from the fuel gas tank 210. A main valve 250, a regulator 260, and an injector 270 are provided in the fuel gas supply passage 220 sequentially from the fuel gas tank 210 side. The main valve 250 turns on/off supply of the fuel gas from the fuel gas tank 210. The regulator 260 decreases the pressure of the fuel gas to a predetermined pressure and supplies the fuel gas to the injector 270. The injector 270 is a kind of an opening/closing valve and is a fuel injection device configured to adjust a hydrogen amount to be supplied to the fuel cell 100 based on a valve opening ratio (a duty ratio). In the present embodiment, three injectors 270 are placed in parallel to each other. Note that the number of injectors 270 is not limited to three, but one injector or a plurality of (two or more) injectors may be provided. When the plurality of injectors 270 is provided like the present embodiment, it is possible to easily adjust an amount of the fuel gas to be injected and supplied to the fuel cell 100 according to an electric-power generation amount requested to be generated by the fuel cell 100. A pressure sensor 255 for high pressure configured to detect the pressure of the fuel gas tank 210 on the output side is provided on the upstream side from the regulator 260, while a pressure sensor 275 for low pressure is provided on the downstream side from the injectors 270.

The fuel gas supply circuit 200 is further provided with a fuel gas exhaust passage 230 and a fuel gas backflow passage 240. Fuel exhaust gas from the fuel cell 100 is discharged via the fuel gas exhaust passage 230. The fuel gas backflow passage 240 is connected to the fuel gas exhaust passage 230 and the fuel gas supply passage 220. A gas/liquid separator 280 is provided between the fuel gas exhaust passage 230 and the fuel gas backflow passage 240. The fuel exhaust gas includes impurities such as the fuel gas that has not been consumed by reaction and nitrogen that has moved through the fuel cell 100, and water. The gas/liquid separator 280 separates water from gas (the impurities such as the fuel gas and nitrogen) in the fuel exhaust gas. The fuel gas backflow passage 240 is provided with a backflow pump 290. The gas including the unconsumed fuel gas separated by the gas/liquid separator 280 is returned to the fuel gas supply passage 220 by the backflow pump 290, so that the gas is reused. The water separated by the gas/liquid separator 280 will be described later.

The air supply circuit 300 is a circuit for supplying, to the fuel cell 100, air including oxygen as oxidant gas. The air sent into the fuel cell 100 is also referred to as "air" or "intake air." An air supply passage 320 via which the air is sent into the fuel cell 100 has an air intake port 305 formed in an upstream end thereof. The air supply passage 320 includes, sequentially from the air intake port 305 toward the fuel cell 100, an air cleaner 310 for removing dust in the air, an air compressor 330 for compressing and sending the air into the fuel cell 100, an inter-cooler 340 for cooling the compressed air (intake air) by use of coolant divided from the cooling circuit 500, and an inlet valve 350 for cutting communication between the fuel cell 100 and the atmospheric air at the time when the fuel cell 100 is not used. Further, an atmospheric pressure sensor 375 for detecting an atmospheric pressure is provided in the most upstream part of the air supply passage 320, and the air cleaner 310 is provided with an outside air temperature sensor 380 for detecting an outside temperature. An air flow meter 385 for detecting an intake amount is provided on the downstream side from the air cleaner 310. In the present embodiment, the air compressor 330 as an air supply is a turbo compressor.

The exhaust gas circuit 400 is connected to the fuel cell 100 and includes an exhaust gas passage 410 via which the air that is not used for electric-power generation in the fuel cell 100 is discharged. A pressure adjusting valve 420 for adjusting the pressure of the air in the fuel cell 100, and a silencer 470 for reducing exhaust noise of the exhaust gas are provided in the exhaust gas passage 410 sequentially from the fuel cell 100 side, and the exhaust port 480 is provided in the terminal end of the exhaust gas passage 410. A fuel gas discharge passage 430 connected to the gas/liquid separator 280 via an gas/water discharge valve 440, and an oxidant gas bypass passage 450 connected to the air supply passage 320 via a bypass valve 455 are connected between the pressure adjusting valve 420 and the silencer 470.

At the time of normal operation of the fuel cell 100, the air supplied from the air supply circuit 300 passes through the cathodes of the single cells laminated in the fuel cell 100 and is discharged from the exhaust gas circuit 400. The flow of the air is generally realized by compression of the air by the air compressor 330 and sending of the air along with this. An air amount to be sent into the fuel cell 100 is variable by adjusting electric power to be supplied to the motor 335 as a power source for driving the air compressor 330. In the fuel cell 100 of the present embodiment, when a nitrogen concentration in the fuel exhaust gas discharged from the fuel gas exhaust passage 230 is increased or an amount of water in the gas/liquid separator 280 is increased due to circulation and reuse of the fuel gas via the fuel gas backflow passage 240, the gas/water discharge valve 440 may be opened so that water and gas are discharged from the fuel gas discharge passage 430 via the exhaust gas passage 410. The gas to be discharged also includes the fuel gas in addition to the impurities such as nitrogen, and therefore, the bypass valve 455 is opened as needed so that the gas to be discharged is diluted by the air supplied from the oxidant gas bypass passage 450.

The cooling circuit 500 includes a coolant supply passage 510, a coolant discharge passage 515, a radiator passage 520, a water pump 525, a radiator 530, a bypass passage 540, and a three-way valve 545. The coolant supply passage 510 is a passage for supplying coolant to the fuel cell 100, and the coolant is sent into the fuel cell 100 by the water pump 525. The coolant discharge passage 515 is a passage for discharging the coolant from the fuel cell 100. The coolant discharge passage 515 is provided with a temperature sensor 550, and the temperature sensor 550 measures a temperature of the coolant discharged from the fuel cell 100. The temperature to be measured by the temperature sensor 550 is generally equal to the temperature of the fuel cell 100, so that the temperature to be measured by the temperature sensor 550 may be used as the temperature of the fuel cell 100 and the temperature sensor 105 may be omitted. A downstream portion of the coolant discharge passage 515 is connected to the radiator passage 520 and the bypass passage 540 via the three-way valve 545. The radiator 530 is provided in the radiator passage 520. The radiator 530 is provided with a radiator fan 535. The radiator fan 535 sends wind to the radiator 530 so as to promote heat dissipation from the radiator 530. A downstream portion of the radiator passage 520 and a downstream portion of the bypass passage 540 are connected to the coolant supply passage 510. The coolant supply passage 510 and the coolant discharge passage 515 are connected to the inter-cooler 340.

Figure 3:
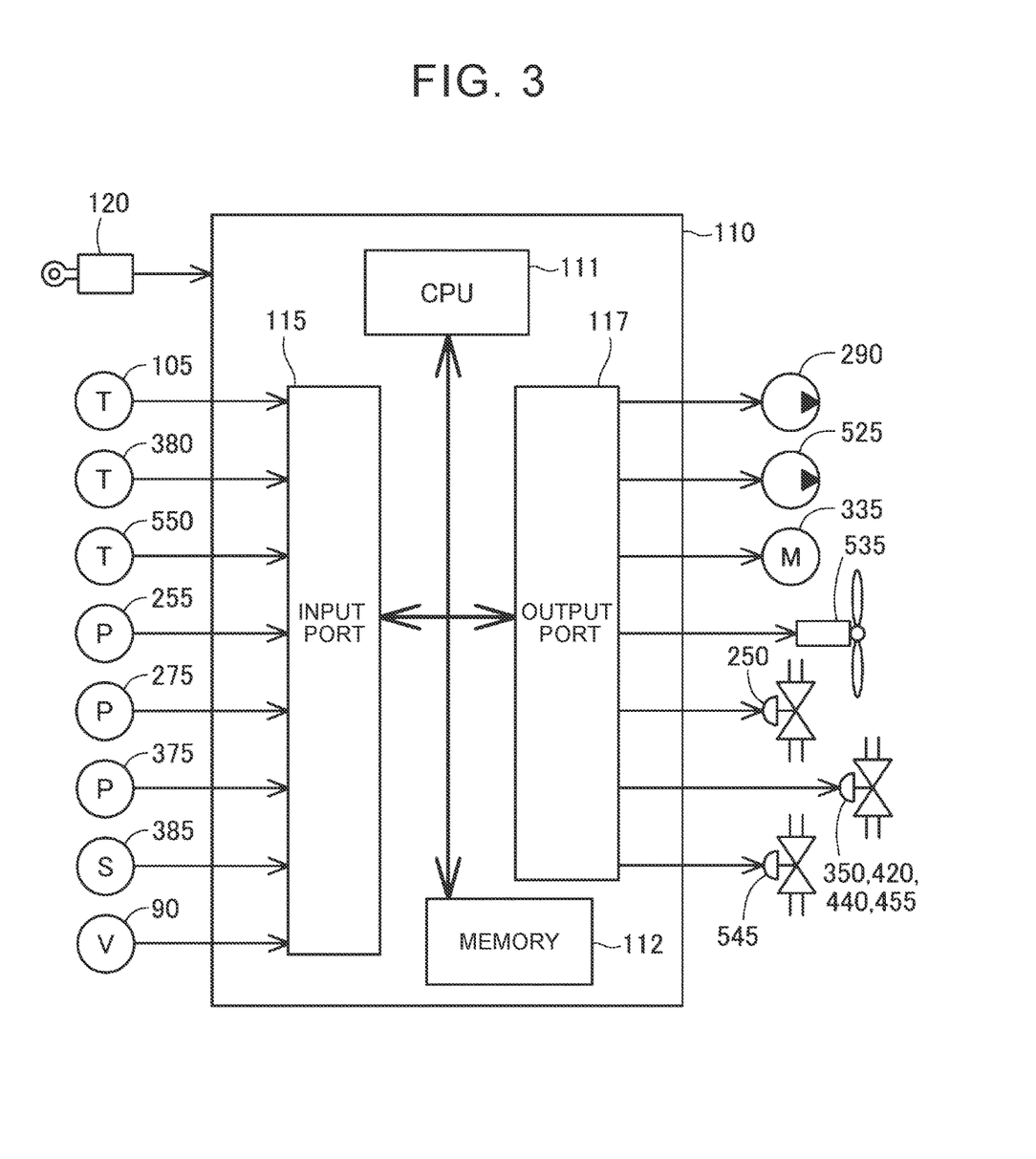
FIG. 3 is an explanatory view illustrating an input-output relationship mainly based on a controller in the fuel cell system.

As illustrated in FIG. 3, the controller 110 is a computer including a CPU 111, a memory 112, an input port 115, and an output port 117, and controls the fuel cell system 11 by executing a program stored in the memory 112. Programs for processing and data such as a power-saving coefficient map (described below) are also stored in the memory 112 in a nonvolatile manner.

The temperature sensors 105, 380, 550, the pressure sensors 255, 275, 375, and the air flow meter 385 of the fuel cell system 11, a vehicle speed sensor 90 for detecting a speed of the vehicle, and the like are connected to the input port 115 of the controller 110. Accordingly, the controller 110 can monitor the state of the fuel cell system 11. In the meantime, actuators provided in the fuel cell system 11, namely, various pumps 290, 525, various valves 250, 350, 420, 455, 545, various motors 335, 535, and the like are connected to the output port 117 of the controller 110. Accordingly, the controller 110 causes the fuel cell 100 to output requested electric power by driving these actuators to supply, to the fuel cell 100, hydrogen gas as the fuel gas and the air including oxygen as the oxidant gas. Further, as described above, the controller 110 drives the drive motor 150 by use of the electric power thus generated by the fuel cell 100, so that the vehicle 10 runs. Note that, in FIG. 3, the connection with the drive motor 150 and the like are not illustrated.

Figure 4:
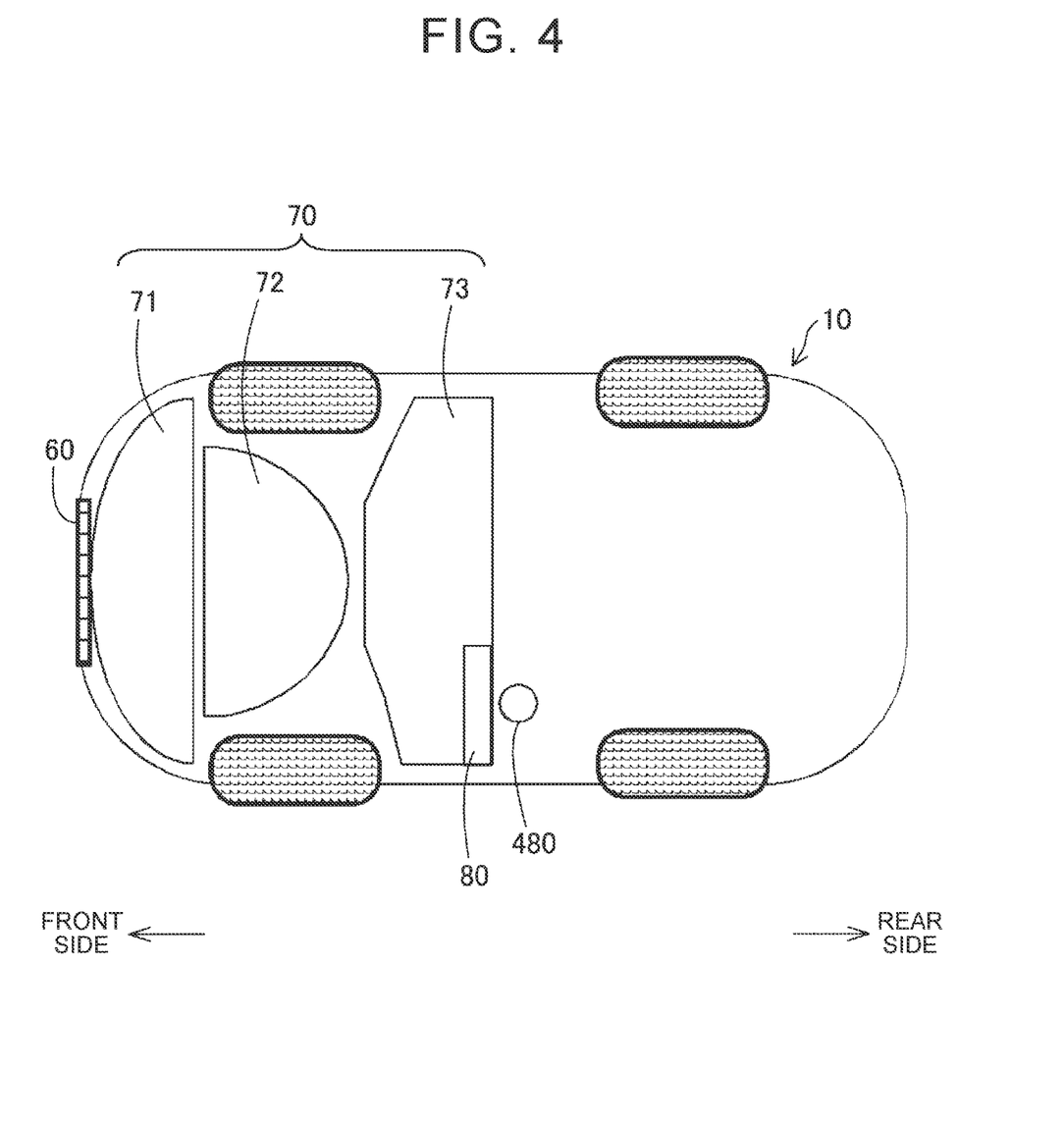
FIG. 4 is an explanatory view schematically illustrating the bottom face of a fuel cell vehicle.

The following describes the arrangement and the like of the exhaust port 480 of the fuel cell 100 with reference to FIG. 4. FIG. 4 is an explanatory view schematically illustrating the bottom face of the vehicle 10. In consideration of discharge of exhaust gas, water, and the like, the bottom face of the vehicle 10 is not completely covered. However, the bottom face of the vehicle 10 is provided with a cover so as to protect the fuel cell 100 and so on housed in an engine compartment or the like. In the present embodiment, the under cover 70 illustrated in FIG. 1 is divided into a plurality of parts, such that a first under cover 71, a second under cover 72, and a third under cover 73 are provided sequentially from the front side of the vehicle 10. As a matter of course, the under cover 70 can be constituted by one plate. In the present embodiment, the under cover is made of metal, but also can be made of reinforced plastic and the like if necessary strength is able to be provided.

A front spoiler 60 is provided further ahead of the under cover 70, so as to restrict the flow of the air on the bottom face of the vehicle 10. Further, the projection portion 80 is provided on the right side (the driver-seat side in a right-hand drive vehicle), in the vehicle width direction, of the rearmost end of the third under cover 73. Here, the projection portion indicates a part projecting from the underfloor of the vehicle 10 toward the ground. The first to third under covers 71 to 73 cause the air taken in from the front spoiler 60 to flow between the bottom face of the vehicle 10 and a road surface, so as to generate a downforce in the present embodiment. This is because the first to third under covers 71 to 73 are formed such that a gap between the bottom face of the vehicle 10 and the road surface becomes narrower from the front side of the vehicle 10 to the rear side thereof along the flow of the air. Since the space between the bottom face of the vehicle 10 and the road surface becomes narrower, the flow rate increases and a negative pressure is caused, so that a downforce is obtained. Accordingly, it is desirable that particularly the third under cover 73 among the under covers be formed as a flat portion having an angle within ±20 degrees with respect to the road surface.

Figure 5:
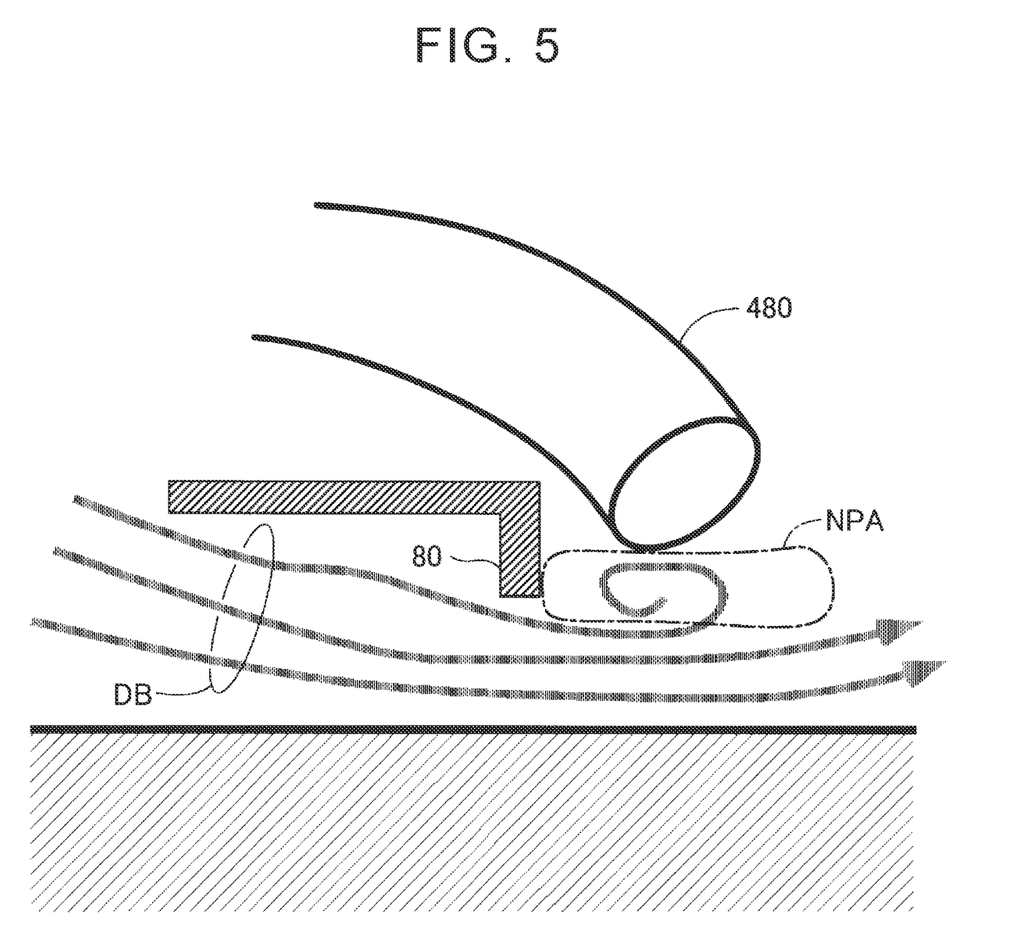
FIG. 5 is an explanatory view schematically illustrating a part around an exhaust port communicating with a cathode of the fuel cell.

Further, in the present embodiment, the projection portion 80 is provided in the rear end of the third under cover 73 and the exhaust port 480 in the terminal end of the exhaust gas circuit 400 of the fuel cell 100 is provided behind the projection portion 80. The arrangement of the projection portion 80 and the exhaust port 480 is illustrated in FIG. 5. As schematically illustrated in FIG. 5, the flow rate of air DB flowing under the third under cover 73 increases due to the projection portion 80, so that a negative pressure is caused partially behind the projection portion 80. The exhaust port 480 is opened in a negative pressure region NPA.

Since the air intake port 305 of the air supply circuit 300 has a pressure generally equal to the atmospheric pressure, a large pressure difference exists between the air intake port 305 and the exhaust port 480 during running of the vehicle 10, in terms of the whole fuel cell 100. Accordingly, while the vehicle 10 is running, the air flows from the air intake port 305 toward the exhaust port 480 due to the pressure difference.

Figure 6:
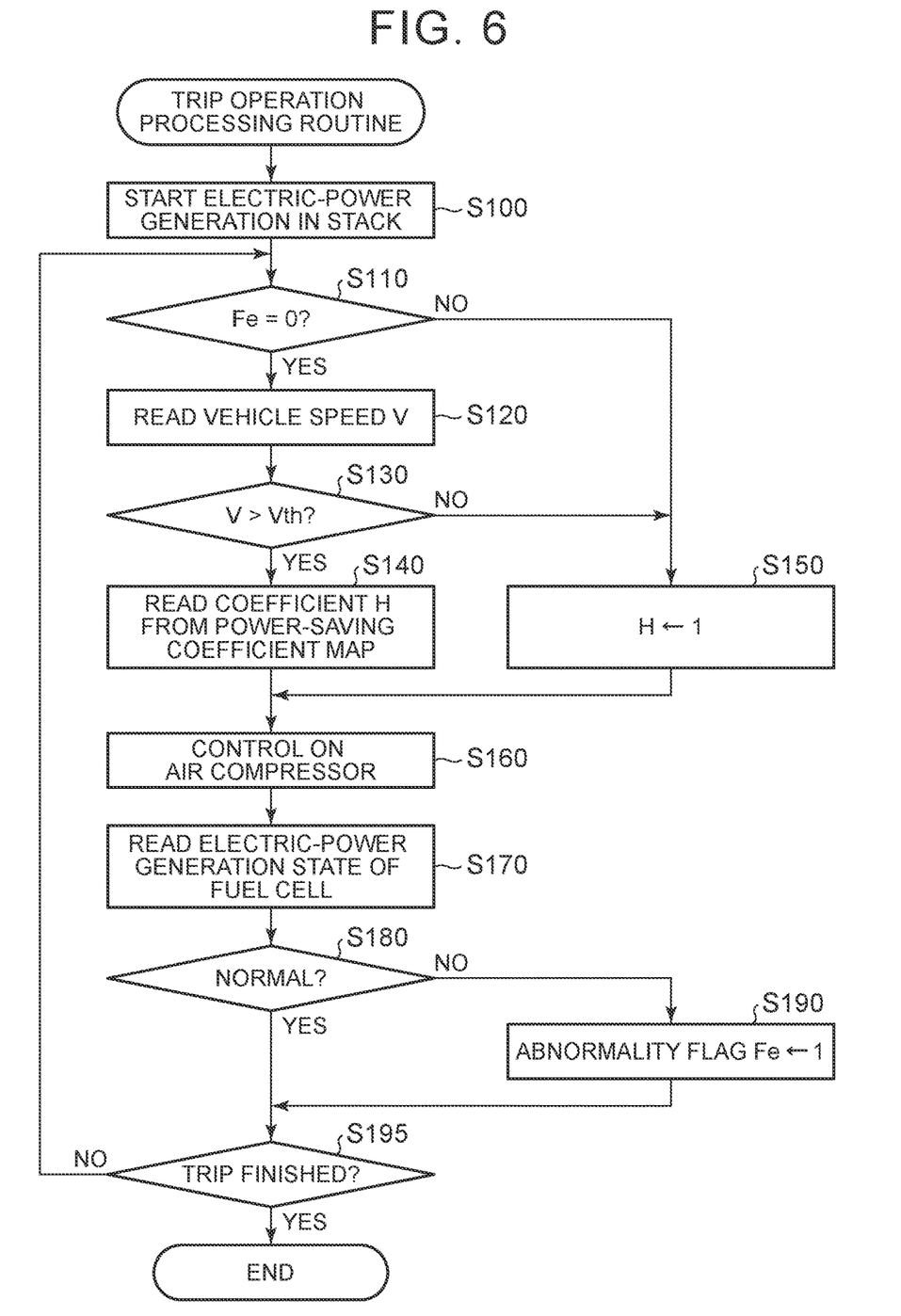
FIG. 6 is a flowchart illustrating a trip operation processing routine performed by the controller.

On the premise of the configuration of the fuel cell system 11 described above, the control performed by the controller 110 will be described below. FIG. 6 is a flowchart illustrating a "trip operation processing routine" performed by the controller 110. A trip indicates one operation of the vehicle 10. That is, in the fuel cell vehicle 10, a trip is from running start of the vehicle 10 by turning on the start switch 120 until the vehicle 10 is stopped and the start switch 120 is turned off.

The processing illustrated in FIG. 6 is accordingly started when the start switch 120 is turned on, and hydrogen as the fuel gas and air as the oxidant gas are first introduced into the fuel cell 100 so that electric-power generation in the stack is started (step S100). When electric-power generation is started, it is subsequently determined whether a value of a flag Fe is 1 or not (step S110). The value of the flag Fe at the time of start of the trip, that is, a default value is 0. Accordingly, just after the start of the trip, the determination in step S110 is "NO."

In view of this, the controller 110 subsequently performs processing of reading a vehicle speed V from the vehicle speed sensor 90 (step S120) and determines whether or not the vehicle speed V is larger than a threshold Vth determined in advance (step S130). When the vehicle speed V is larger than the threshold Vth, the controller 110 then performs processing of reading a coefficient H from a power-saving coefficient map (step S140).

Figure 7:
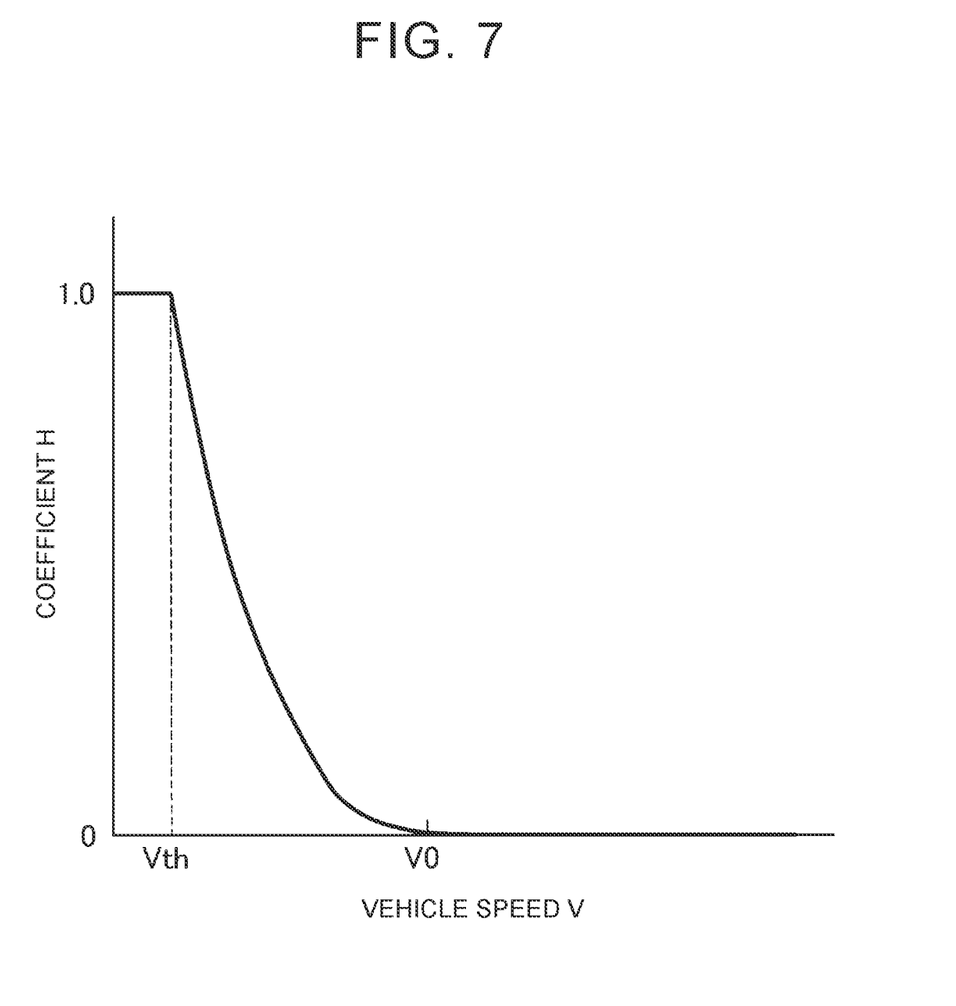
FIG. 7 is an explanatory graph illustrating an example of a power-saving coefficient map.

An example of the power-saving coefficient map is illustrated in FIG. 7. As illustrated in the figure, in the power-saving coefficient map, the coefficient H has a value of 1 until the vehicle speed V reaches the threshold Vth. When the vehicle speed V exceeds the threshold Vth, the coefficient H becomes a small value corresponding to the vehicle speed V, and when the vehicle speed V becomes larger than or equal to a predetermined value Vlt, the coefficient H becomes zero. The coefficient H obtained from the power-saving coefficient map is used to reduce power consumption in control of the motor 335 of the air compressor 330, as will be described below.

When the controller 110 reads the coefficient H from the power-saving coefficient map, the controller 110 performs electric-power control on the motor 335 of the air compressor 330 by use of the coefficient H thus read (step S160). More specifically, a rating electric-power amount Pm of the motor 335, set in advance to send the air with an amount corresponding to a requested electric-power generation amount into the fuel cell 100, is multiplied by the coefficient H thus read, so that the motor 335 of the air compressor 330 is controlled. Accordingly, when the vehicle speed V is larger than the threshold Vth, electric power used for driving of the motor 335 is reduced.

As such, when driving electric power for the motor 335 that drives the air compressor 330 is reduced, the amount of the air to be sent into the fuel cell 100 by the air compressor 330 is reduced. However, when the vehicle 10 is running, the exhaust gas of the fuel cell 100 is taken out by a negative pressure caused due to travel wind in the negative pressure region (see FIG. 5, the reference sign NPA) around the exhaust port 480 as illustrated in FIG. 5. On this account, even if the driving electric power for the motor 335 is reduced, lack of oxygen does not occur in the fuel cell 100 generally.

Thus, the controller 110 performs power-saving control on the air compressor 330 by use of the coefficient H (step S160), and the controller 110 performs processing of reading an electric-power generation state of the fuel cell 100 (step S170). The electric-power generation state of the fuel cell 100 indicates various parameters based on which the electric-power generation state of the fuel cell 100 can be determined, e.g., an electric-power generation amount of the fuel cell 100 acquired via the electric-power distribution controller 140, a temperature of the fuel cell 100 detected by the temperature sensor 105, a pressure on the downstream side from the injectors 270, and the like.

The controller 110 determines the parameters comprehensively so as to determine whether the electric-power generation state of the fuel cell 100 is normal or not (step S180). When electric-power generation is performed normally, the controller 110 does not perform anything. In the meantime, when the controller 110 cannot determine that electric-power generation is normal, the controller 110 sets an abnormality flag Fe to 1 (step S190). After that, the controller 110 determines whether the trip is finished or not (step S195) and repeats the processing (steps S110 to S195) until the trip is finished.

When electric-power generation of the fuel cell has an abnormality due to power-saving control on the motor 335 of the air compressor 330 (Fe=1), the determination in step S110 is "NO." Accordingly, similarly to the case where the vehicle speed V is the threshold Vth or less, the controller 110 shifts to step S150 in which the coefficient H is set to 1. As a result, when it is determined that electric-power generation of the fuel cell 100 has an abnormality and the abnormality flag Fe is set to 1, power-saving control is not performed after that. Note that a flag indicative of whether or not power-saving operation is temporarily stopped may be provided in addition to the abnormality flag Fe such that the power-saving operation temporary stop flag is set to 1 in step S190, and when the flag is set to 1, the power-saving operation is stopped temporarily. The flag may be initialized to 1 every time the trip is finished, or when it is determined that the fuel cell 100 operates normally, the flag may be initialized to 0. Alternatively, the flag may be initialized based on other conditions set in advance, e.g., manual operation by a driver, and the like.

Figure 8:
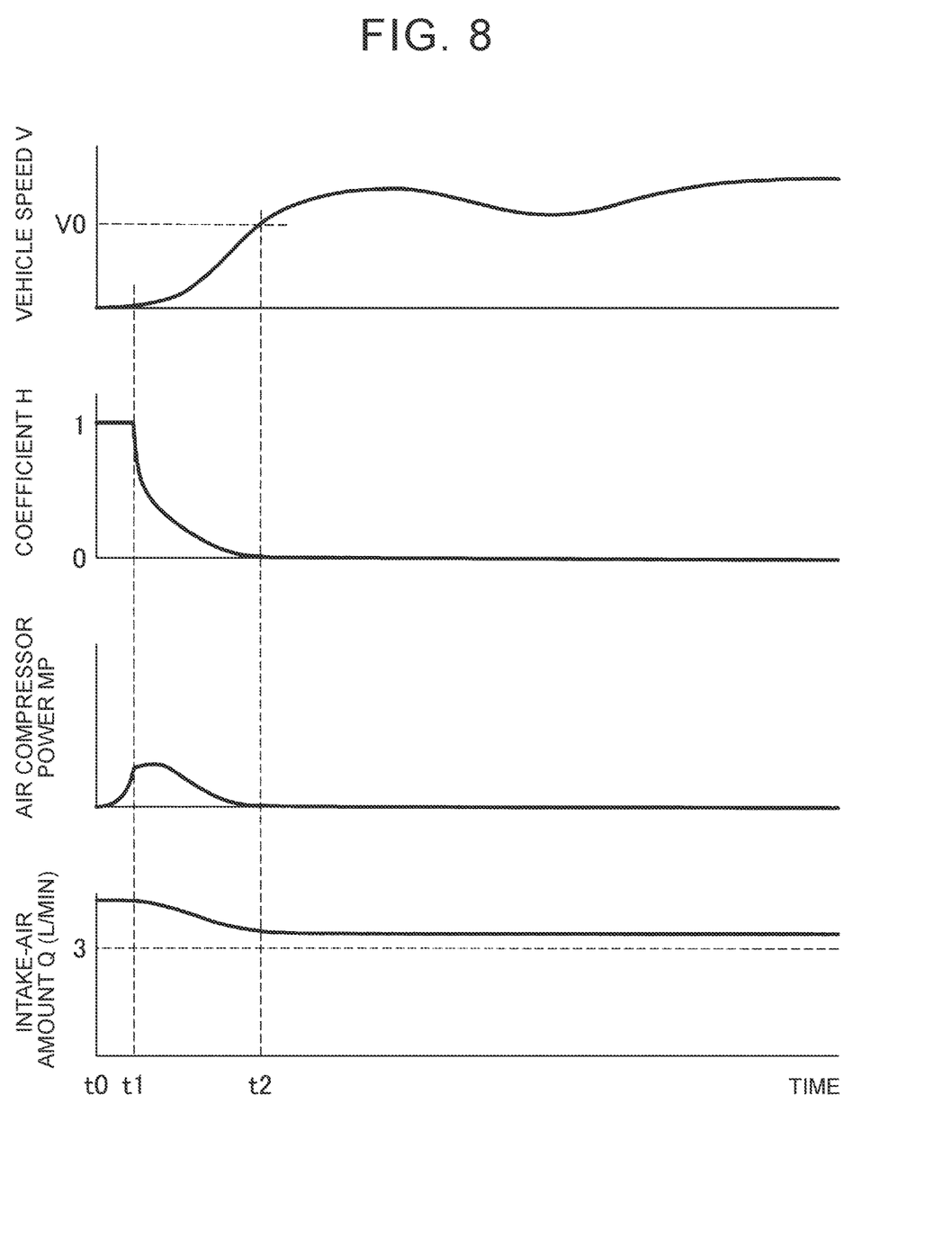
FIG. 8 is a graph illustrating transition of an air compressor power MP and the like at the time when power-saving control is performed.

How electric power and the like of the motor 335 of the air compressor 330 are controlled by execution of the trip processing routine is exemplified in FIG. 8. In this example, when the fuel cell 100 is started (at time t0) and the vehicle 10 starts running, the coefficient H found from the power-saving coefficient map is 1 until the timing at which the vehicle speed V reaches the threshold Vth (at time t1). Accordingly, electric power (described as "AIR COMPRESSOR POWER" in FIG. 8) MP to be consumed by the motor 335 of the air compressor 330 is not particularly reduced. At this time, an intake-air amount Q detected by the air flow meter 385 exceeds 3 L/min. The intake air is supplied to the cathodes in the fuel cell 100 so as to be used for electric-power generation, but the intake-air amount Q of 3 L/m exceeds an air amount necessary for a maximum electric-power generation amount of the fuel cell 100 in the present embodiment.

When the vehicle speed V of the vehicle 10 becomes larger than the threshold Vth, the value of the coefficient H becomes smaller according to the vehicle speed V, so that the air compressor power MP becomes smaller. This is because the magnitude of the negative pressure caused in the negative pressure region NPA is considered to be larger when the vehicle speed V becomes larger. That is, the air compressor power MP is lower when the magnitude of the estimated negative pressure is high than when the magnitude of the estimated negative pressure is low. Then, when the vehicle speed V exceeds a predetermined value V0 (at time t2), the coefficient H becomes zero and the air compressor power MP also becomes zero. In this case, a magnitude, that is, an absolute value of the negative pressure which is estimated on the basis of vehicle speed V is considered to be larger than or equal to a predetermined value. Even in this case, the intake-air amount Q exceeds 3 L/m that is necessary for electric-power generation of the fuel cell 100. Accordingly, the fuel cell 100 keeps performing electric-power generation normally.

According to the fuel cell vehicle of the present embodiment described above, a negative pressure is caused in the negative pressure region NPA around the exhaust port 480 by travel wind caused during running of the vehicle 10, and discharge of the exhaust gas from the fuel cell 100 and eventually intake of the air into the fuel cell 100 are realized by use of the negative pressure. In the present embodiment, in the case where the vehicle speed V is the predetermined value V0 or more, even if the air compressor 330 is stopped, the air necessary for electric-power generation does not become insufficient. Besides, the negative pressure used for intake of the air uses a part of a downforce to be applied to the vehicle at the time when the vehicle 10 runs. Accordingly, it is not necessary to prepare a special structure and the like for causing a negative pressure. Further, in a state where the vehicle 10 runs and a large electric power is required, the air using the negative pressure is sent into the fuel cell 100. Accordingly, the air compressor 330 and the motor 335 can be downsized. When the air compressor 330 and the motor 335 are downsized, their weights are also reduced, thereby making it possible to improve fuel efficiency of the vehicle 10.

In the present embodiment, a turbo compressor is employed as the air compressor 330. Accordingly, when the vehicle speed V becomes higher than the predetermined value V0 and the air compressor 330 is stopped, a degree that the air compressor 330 itself has a pressure loss to intake of the air is small. As a matter of course, a bypass passage that bypasses the air compressor 330 may be provided so that the bypass passage is opened when the air compressor 330 is stopped. In this case, it is easy to employ, as the air compressor 330, compressors of other types, e.g., a roots-type compressor having a relatively high pressure loss.

Further, in the embodiment, whether or not a negative pressure due to travel wind is obtained is determined based on the vehicle speed V. Accordingly, it is possible to avoid or restrain occurrence of such a situation that, although a sufficient negative pressure is not obtained, the electric power MP of the air compressor 330 is reduced and the fuel cell 100 falls into oxygen deficiency. Further, based on the electric-power generation state of the fuel cell 100, if the electric-power generation state has any abnormality for some reason (Fe=1), power-saving control on the air compressor 330 is stopped. Hence, the fuel cell 100 does not operate while the negative pressure is insufficient. There is a possibility of such a situation that a negative pressure is not caused though the vehicle runs, in a case where wind at the same level as the vehicle speed V blows in the same direction as the travel direction of the vehicle 10, for example. In the present embodiment, power-saving control is stopped in such a case. However, whether power-saving control is stopped or not is determined every trip, and therefore, when the travel direction, the direction of wind, wind power, and the like change, power-saving control can be restarted in a new trip. Accordingly, it is possible to sufficiently obtain an advantage of power-saving control on the air compressor 330 using a negative pressure. Instead of estimating and determining occurrence and quantity of a negative pressure in the negative pressure region based on the vehicle speed V, an air speed indicator for detecting a flow rate of wind or a negative-pressure sensor for directly measuring a negative pressure, such as a pitot tube, may be provided in the vicinity of the exhaust port 480, such that, when a condition that a negative pressure is caused actually is established or when a negative pressure is caused actually, power-saving control on the air compressor 330 may be performed.

In the present embodiment, after the vehicle speed V exceeds the threshold but until the vehicle speed V reaches the predetermined value V0, the air compressor power MP is reduced according to the vehicle speed. However, the air compressor 330 may be operated normally before the vehicle speed V reaches a prescribed threshold, and when the vehicle speed V becomes larger than or equal to the prescribed threshold, the air compressor 330 may be stopped. Alternatively, even if the vehicle speed V becomes large, the air compressor power MP may be maintained to be larger than or equal to zero. The projection portion 80 may not be provided in particular so as to cause a negative pressure. If the shape of the under cover 70 has a part that can be used as the projection portion 80, the exhaust port 480 may be provided in the vicinity of the part.

A relationship between a region where a negative pressure is caused by the shape of a part of the under cover 70 and the arrangement of the fuel cell 100 is not limited in particular. However, when the region is provided on the front side in the vehicle 10, e.g., forward of the rear wheels, it is possible to easily cause a negative pressure by use of a downforce. In the meantime, it is preferable to provide the exhaust port 480 not so distanced from the fuel cell 100 because the pipe can be shortened. In order to prevent moisture content included in the exhaust gas from being scattered backward as water, it is preferable that the position of the exhaust port 480 be near a central part of the vehicle 10. As the arrangement that satisfies those conditions, the exhaust port 480 is preferably placed between the front wheels and the rear wheels of the vehicle 10. As a matter of course, if a point that a negative pressure based on a downforce is used is satisfied, the other conditions, e.g., the arrangement of the fuel cell 100 and the exhaust port 480, are changeable. For example, the fuel cell 100 may be provided on the rear side in the vehicle 10, and the exhaust port 480 may be provided forward of the fuel cell 100.

The embodiment assumes travel wind to cause a negative pressure by a downforce, but at the time when the vehicle 10 stops, cooling air by the radiator fan 535 may be guided to the vicinity of the exhaust port 480 so as to cause a negative pressure. At the time when the vehicle 10 stops, the electric-power generation amount of the fuel cell 100 is small generally. Accordingly, it is possible to secure a necessary amount of oxygen for electric-power generation by drawing of the exhaust gas by a slight negative pressure, and eventually, by intake of the air by the fuel cell 100. In this case, the air compressor 330 and the motor 335 that drives the air compressor 330 can be omitted.

In the embodiment, a negative pressure in the negative pressure region near the exhaust port 480 is used for intake of the air necessary for electric-power generation of the fuel cell 100, but intake of the air by the negative pressure may be used for an increase of the air amount required at the time when the fuel gas is diluted and discharged, for example. In this case, the oxidant gas bypass passage 450 and the bypass valve 455 may be omitted.

The disclosure is not limited to the above embodiment and other embodiments and is achievable in various configurations within a range that does not deviate from the gist of the disclosure. The technical features of the embodiment and other embodiments can be replaced or combined appropriately, in order to resolve some or all of the problems described above or in order to achieve some or all of the above effects. Further, the technical features can be deleted appropriately if the technical features have not been described as essential in the present specification.

What is claimed is:

1. A fuel cell vehicle comprising:
 a fuel cell;
 a portion having a shape causing a downforce, the portion being at least a part of an underfloor of a vehicle body and being configured to apply the downforce to the vehicle body by wind passing below the underfloor;
 an exhaust port via which exhaust gas from a cathode-side passage of the fuel cell is discharged;
 an air supply driven by driving power of a power source and configured to supply air to the fuel cell;
 a detection portion programmed to detect or estimate a magnitude of the negative pressure caused by the shape causing the downforce; and
 a controller configured to perform control to reduce a driving amount of the air supply driven by the power source according to the magnitude of the negative pressure which is detected or estimated by the detection portion, wherein
 the exhaust port is disposed in a negative pressure region where a negative pressure is caused by the shape causing the downforce.

2. The fuel cell vehicle according to claim 1, wherein the fuel cell and the portion having the shape causing the downforce are provided in a front part of the vehicle body in a travel direction.

3. The fuel cell vehicle according to claim 2, wherein the front part of the vehicle body in the travel direction is a part forward of rear wheels provided in the fuel cell vehicle.

4. The fuel cell vehicle according to claim 1, wherein the negative pressure region is provided between front wheels and rear wheels provided in the fuel cell vehicle.

5. The fuel cell vehicle according to claim 1, wherein the shape causing the downforce includes: a flat portion provided in at least a part of the underfloor and formed at an angle within ±20 degrees with respect to a road surface; and a projection portion projecting from the flat portion in a direction toward the road surface.

6. The fuel cell vehicle according to claim 1, wherein the air supply is a compressor configured to send the air into the fuel cell, the compressor being provided on an upstream side of a passage via which the air is supplied to the fuel cell.

7. The fuel cell vehicle according to claim 6, wherein the compressor is a turbo compressor.

8. The fuel cell vehicle according to claim 1, wherein:
the detecting portion is at least any one of a negative pressure sensor, a speed sensor, and a flow rate sensor;
the negative pressure sensor measures the magnitude of the negative pressure;
the speed sensor detects a speed of the fuel cell vehicle; and
the flow rate sensor measures a flow rate of air around the exhaust port.

9. The fuel cell vehicle according to claim 1, wherein the controller is configured not to drive the air supply when an absolute value of the negative pressure which is detected or estimated by the detection portion is larger than or equal to a predetermined value.

10. A control method for controlling a fuel cell vehicle, the fuel cell vehicle being configured such that at least a part of an underfloor of a vehicle body is formed to have a shape causing a downforce to the vehicle body by wind passing below the underfloor, and an exhaust port via which exhaust gas from a cathode-side passage of the fuel cell is discharged is disposed in a negative pressure region where a negative pressure is caused by the shape causing the downforce, the control method comprising:
detecting or estimating a magnitude of the negative pressure to be caused by the shape causing the downforce; and
controlling a driving amount of an air supply according to the magnitude of the negative pressure which is detected or estimated, the air supply being configured to supply air to the fuel cell, wherein the air supply is driven by driving power of a power source.

* * * * *